(12) United States Patent
Ohno et al.

(10) Patent No.: US 8,334,230 B2
(45) Date of Patent: Dec. 18, 2012

(54) HONEYCOMB STRUCTURE

(75) Inventors: Kazushige Ohno, Ibi-Gun (JP);
Masafumi Kunieda, Ibi-Gun (JP);
Takahiko Ido, Ibi-Gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 243 days.

(21) Appl. No.: 12/507,066

(22) Filed: Jul. 22, 2009

(65) Prior Publication Data
US 2009/0291836 A1     Nov. 26, 2009

Related U.S. Application Data

(63) Continuation of application No. PCT/JP2008/059272, filed on May 20, 2008.

(51) Int. Cl.
*B01J 29/06*     (2006.01)
(52) U.S. Cl. ............. 502/60; 502/64; 502/68; 502/73; 502/74; 502/77; 502/78; 502/79; 502/527.19; 502/527.24
(58) Field of Classification Search ............. 502/60, 502/64, 68, 73, 74, 77, 78, 79, 527.19, 527.24
See application file for complete search history.

(56) References Cited

U.S. PATENT DOCUMENTS

| | | | |
|---|---|---|---|
| 5,934,069 A | 8/1999 | Hertl et al. | |
| 6,159,431 A * | 12/2000 | Inoue et al. | 422/180 |
| 6,656,564 B2 | 12/2003 | Ichikawa et al. | |
| 6,803,087 B2 * | 10/2004 | Brew et al. | 428/116 |
| 7,037,567 B2 * | 5/2006 | Hashimoto et al. | 428/116 |
| 2002/0042344 A1 | 4/2002 | Kondo et al. | |
| 2007/0259770 A1 * | 11/2007 | Hofmann et al. | 502/60 |

FOREIGN PATENT DOCUMENTS

| | | |
|---|---|---|
| EP | 0820810 | 1/1998 |
| EP | 1840347 | 10/2007 |
| EP | 1847320 | 10/2007 |
| GB | 2342055 | 4/2000 |
| JP | 11-277653 | 10/1999 |
| JP | 2006-281134 | 10/2006 |
| WO | WO 02/11884 | 2/2002 |
| WO | WO 2006/137149 | 12/2006 |

OTHER PUBLICATIONS

European Office Action for corresponding EP Application No. 09006707.5-2104, Sep. 27, 2012.

* cited by examiner

*Primary Examiner* — Elizabeth Wood
(74) *Attorney, Agent, or Firm* — Ditthavong Mori & Steiner, P.C.

(57) ABSTRACT

A honeycomb structure includes at least one honeycomb unit which includes walls. The walls have a thickness of from about 0.10 mm to about 0.50 mm and extend along a longitudinal direction of the honeycomb structure to define through-holes. The honeycomb structure has a center area inside a boundary line passing through positions located at substantially a half of a length from a center of the honeycomb structure to a periphery of the honeycomb structure in a cross section perpendicular to the longitudinal direction. The honeycomb structure has a peripheral area outside the boundary line. A thickness of the walls located in the peripheral area is larger than a thickness of the walls located in the center area. A first opening ratio in the center area in the cross section is larger than a second opening ratio in the peripheral area in the cross section.

38 Claims, 4 Drawing Sheets

HONEYCOMB STRUCTURE

CROSS-REFERENCE TO RELATED APPLICATIONS

The present application is a continuation application of International Application No. PCT/JP2008/059272 filed on May 20, 2008, the entire contents of which are hereby incorporated by reference herein.

BACKGROUND OF THE INVENTION

1. Field of the Invention

The present invention relates to a honeycomb structure.

2. Description of the Related Art

Conventionally, a SCR (Selective Catalytic Reduction) system which reduces $NO_x$ to nitrogen and water by using ammonia is known as one of systems for cleaning exhaust gas from an automobile (see the followings).

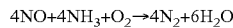

$$4NO+4NH_3+O_2 \rightarrow 4N_2+6H_2O$$

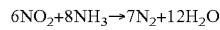

$$6NO_2+8NH_3 \rightarrow 7N_2+12H_2O$$

$$NO+NO_2+2NH_3 \rightarrow 2N_2+3H_2O$$

Also, zeolite is known as materials for adsorbing ammonia in a SCR system.

Meanwhile, International Publication No. WO 06/137149 discloses a honeycomb structure wherein a honeycomb unit is configured to include an inorganic particle and an inorganic fiber and/or whisker and the inorganic particle is at least one kind selected from the group including alumina, silica, zirconia, titania, ceria, mullite, and zeolites.

The entire content of International Publication No. WO 06/137149 is hereby incorporated by reference.

SUMMARY OF THE INVENTION

According to one aspect of the present invention, a honeycomb structure includes at least one honeycomb unit, a center area, and a peripheral area. The at least one honeycomb unit has a longitudinal direction and includes a zeolite, an inorganic binder, and walls. The walls have a thickness of from about 0.10 mm to about 0.50 mm and extend along the longitudinal direction to define through-holes. The center area is located inside a boundary line passing through positions located at substantially a half of a length from a center of the honeycomb structure to a periphery of the honeycomb structure in a cross section perpendicular to the longitudinal direction. The peripheral area is located outside the boundary line. A thickness of the walls located in the peripheral area is larger than a thickness of the walls located in the center area. A first opening ratio in the center area in the cross section is larger than a second opening ratio in the peripheral area in the cross section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Some illustrative embodiments and specific examples of the present invention will be described with reference to the accompanying drawings.

According to an embodiment of the present invention, there is provided a honeycomb structure including a honeycomb unit including a zeolite, an inorganic binder, and plural through-holes intervened by a partition wall, extending in its longitudinal directions and provided in parallel, wherein a thickness of the partition wall is about 0.10 mm or more and about 0.50 mm or less, and where its cross section perpendicular to the longitudinal directions is dual-partitioned at generally equally-spaced intervals from its periphery to its center, the thickness of the partition wall in its periphery side area is greater than that in its center side area and an opening ratio of the cross section perpendicular to the longitudinal directions in the center side area is greater than that in the periphery side area.

Herein, in a honeycomb structure according to an embodiment of the present invention, a peripheral coat layer may be formed on its peripheral surface, and the center side area and the periphery side area are defined for the honeycomb structure except the peripheral coat layer in the case where the honeycomb structure has a peripheral coat layer and defined for the honeycomb structure in the case where the honeycomb structure has no peripheral coat layer.

When a conventional honeycomb structure using a zeolite as a base raw material is used in a SCR system, most of exhaust gas flows through the central part of the honeycomb structure, and accordingly, ammonia adsorbed to the zeolite in the peripheral part of the honeycomb structure is not effectively used for conversion of NOx so that there is a problem that the rate of conversion of NOx is insufficient. It is considered that this is because exhaust gas flows through the central part of the honeycomb structure so that the central part and peripheral part of the honeycomb structure are at a high temperature and a low temperature, respectively. Thus, it is considered that the mechanism of reduction reaction of NOx depends on temperature, and specifically, it is considered that the rate of the reaction at a high temperature is high compared to its diffusion rate, and therefore, exhaust gas does not penetrate into the inside of a partition wall of the honeycomb structure so that ammonia adsorbed to a zeolite inside the partition wall is not effectively used for conversion of NOx.

It is possible for an embodiment of the present invention to provide a honeycomb structure capable of improving a rate of conversion of NOx in a SCR system.

Figure 1A:
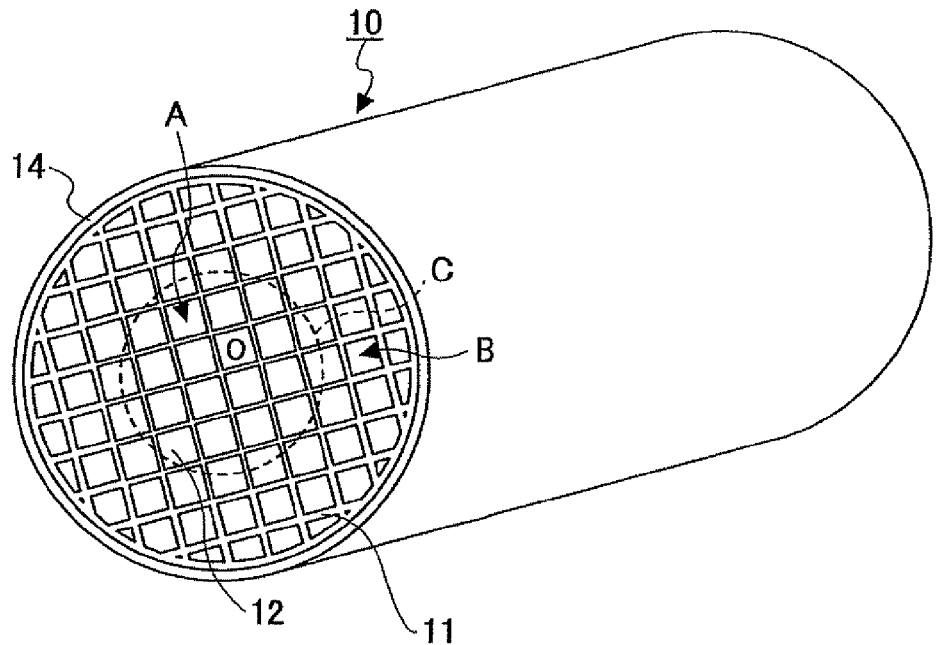
FIG. 1A is a perspective view illustrating one example of a honeycomb structure according to an embodiment of the present invention.
Figure 1B:
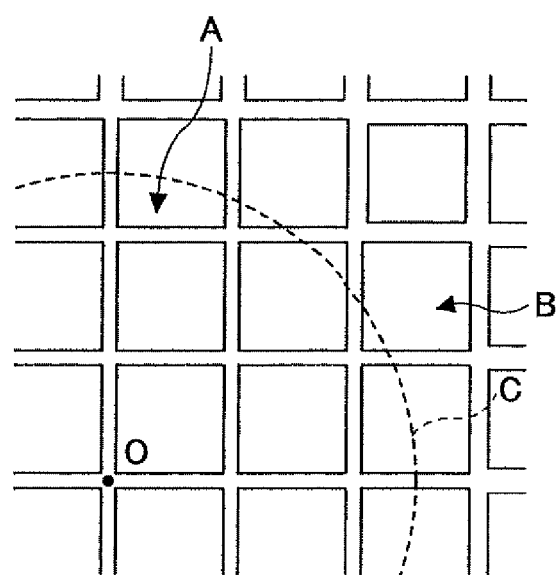
FIG. 1B is an enlarged view of a cross section perpendicular to the longitudinal directions of the honeycomb structure in FIG. 1A.
Figure 1C:
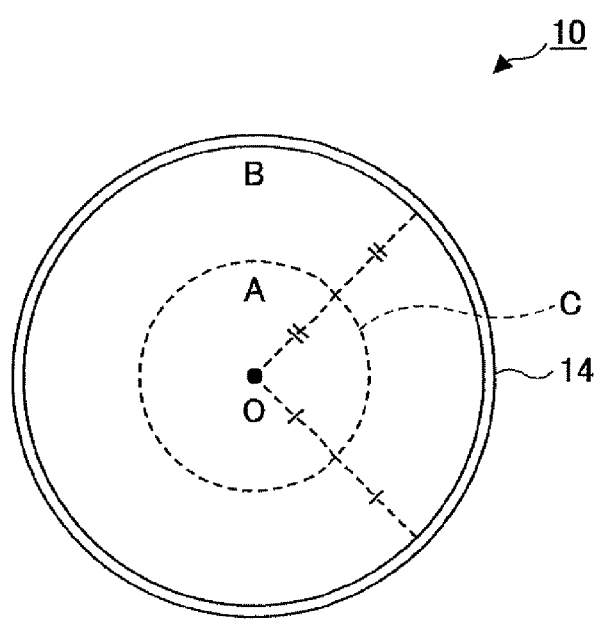
FIG. 1C is a schematic diagram illustrating a cross section perpendicular to the longitudinal directions in FIG. 1A.

FIG. 1A, FIG. 1B, and FIG. 1C illustrate one example of a honeycomb structure according to an embodiment of the present invention. Herein, FIG. 1A, FIG. 1B, and FIG. 1C are a perspective view of a honeycomb structure 10, an enlarged view of its cross section perpendicular to its longitudinal directions, and a schematic diagram illustrating a cross section perpendicular to the longitudinal directions, respectively. The honeycomb structure 10 includes a single honeycomb unit 11 which contains a zeolite and an inorganic binder, wherein a peripheral coat layer 14 is formed on the peripheral surface of a single honeycomb unit 11 in which plural through-holes 12 intervened by a partition wall, extending the longitudinal directions and provided in parallel. Herein, the thickness of the partition wall is about 0.10-about 0.50 mm. Also, when a cross section perpendicular to the longitudinal directions of the honeycomb unit except the peripheral coat layer 14 is dual-partitioned at generally equally-spaced intervals from its periphery to its center O, the thickness of the partition wall in its periphery side area B is greater than that in its center side area A and the opening ratio of the cross section perpendicular to the longitudinal directions in the center side area A is greater than that in the periphery side area B. Additionally, the boundary between the center side area A and the periphery side area B is refereed to as a boundary line C. As such a honeycomb structure 10 is applied to a SCR system (for example, a urea SCR system), it tends to be possible to effectively use ammonia adsorbed to the zeolite inside the partition wall in the center side area A of the honeycomb structure 10 through which most of exhaust gas flows in order to convert NOx. Herein, because the reaction rate of reaction of NOx with ammonia adsorbed to the zeolite is dominant over the diffusion rate of diffusion of NOx in the partition wall in the center side area A at a high temperature, it is considered that it is possible to use the zeolite inside the partition wall effectively for conversion of NOx due to a small thickness of the partition wall. Furthermore, because the opening ratio of the honeycomb unit 11 is large in the center side area A, its pressure loss tends not to be large. As a result, it is considered that it is possible to improve the rate of conversion of NOx. On the other hand, because the diffusion rate of diffusion of NOx in the partition wall is dominant over the reaction rate of reaction of NOx with ammonia adsorbed to the zeolite in the periphery side area B at a low temperature, it is considered that the thickness of the partition wall and the opening ratio are larger and smaller, respectively, than those in the center side area A whereby it is possible to improve the rate of conversion of NOx.

Additionally, if the thickness of the partition wall is about 0.10 mm or more, the strength of the honeycomb unit 11 tends not to be decreased, and if it is about 0.50 mm or less, exhaust gas tends to penetrate into the inside of the partition wall and the zeolite tends to be used for conversion of NOx effectively.

The honeycomb structure 10 will be specifically described below. In the honeycomb unit 11, the center side area A and the periphery side area B are present with the boundary line C, wherein the boundary line C is a line connecting points at which line segments connecting the center O and the periphery are generally bisected in a cross section perpendicular to the longitudinal directions of the honeycomb unit 11. Therefore, the boundary line C is similar to the periphery of the honeycomb unit 11. Furthermore, the thickness of the partition wall (except a partition wall(s) intersecting with the boundary line C) is generally constant in each of the center side area A and the periphery side area B. Herein, the thickness of the partition wall intersecting with the boundary line C is the thickness of the partition wall in the center side area A.

Additionally, it is possible to obtain the thicknesses of the center side area A and periphery side area B from partition walls which do not intersect with the boundary line C in the respective areas. Also, it is possible to obtain the opening ratios of the center side area A and periphery side area B from areas which do not contain a through hole(s) 12 or partition wall which intersects with the boundary line C in the respective areas.

In the honeycomb structure according to an embodiment of the present invention, the thickness of the partition wall in each of the center side area and the periphery side area may generally be constant or may vary continuously or discontinuously. When the thickness of the partition wall varies in the center side area, it is preferable that the thickness of the partition wall be smaller as approaching the center of the honeycomb unit at which it tends to be at a high temperature, in order to use the zeolite inside the partition wall effectively for conversion of NOx. Also, when the thickness of the partition wall varies in the periphery side area, it is preferable that the thickness of the partition wall be larger as approaching the periphery of the honeycomb structure at which it tends to be at a low temperature, in order to use the zeolite inside the partition wall effectively for conversion of NOx.

In the center side area A, it is preferable that the thickness of the partition wall be about 0.10-about 0.45 mm, wherein about 0.15-about 0.35 mm is more preferable. If the thickness of the partition wall in the center side area A is about 0.10 mm or more, the strength of the honeycomb unit 11 tends not to be decreased, and if it is about 0.45 mm or less, the zeolite inside the partition wall in the center side area A tends be used for conversion of NOx effectively.

In the periphery side area B, it is preferable that the thickness of the partition wall be about 0.15-about 0.50 mm, wherein about 0.20-about 0.40 mm is more preferable. If the thickness of the partition wall in the periphery side area B is about 0.15 mm or more, the strength of the honeycomb unit 11 tends not to be decreased, and if it is about 0.50 mm or less, the zeolite inside the partition wall in the periphery side area B tends to be used for conversion of NOx effectively.

It is preferable that the ratio of the thickness of the partition wall in the periphery side area B to the thickness of the partition wall in the center side area A be about 1.1-about 2.0. If the ratio is about 1.1 or more, the zeolite inside the partition wall in the center side area A tends to used for conversion of NOx effectively, and if it is more than about 2.0 or less, stress tends not to be caused in the part in which the thickness of the partition wall varies, so that the strength of the honeycomb unit 11 tends not to be insufficient.

In the center side area A, it is preferable that the opening ratio be about 55-about 75%. If the opening ratio in the center side area A is about 55% or more, the pressure loss tends not to be large so that fuel consumption tends not to be decreased, and if it is about 75% or less, the strength of the honeycomb unit 11 tends not to be insufficient.

In the periphery side area B, it is preferable that the opening ratio be about 35-about 65%. If the opening ration in the periphery side area B is about 35% or more, the zeolite inside the partition wall tends to be used for conversion of NOx effectively or the pressure loss tends not to be large, and if it is about 65% or less, the strength of the honeycomb unit 11 tends not to be insufficient.

It is preferable that the ratio of the opening ratio in the periphery side area B to the opening ratio in the center side area A be about 0.6-about 0.9. If this ratio of the opening ratios is about 0.6 or more, stress tends not to be caused in the part in which the thickness of the partition wall varies, so that the strength of the honeycomb unit 11 tends not to be insufficient and if is about 0.9 or less, the zeolite inside the partition wall in the center side area A tends to be used for conversion of NOx effectively.

For the honeycomb unit 11, it is preferable that the content of the zeolite per its apparent volume be about 230-about 270 g/L. Herein, the apparent volume of the honeycomb unit means a volume including the through-holes. If the content of the zeolite per the apparent volume of the honeycomb unit 11 is about 230 g/L or more, the apparent volume of the honeycomb unit 11 does not have to be large in order to obtain a sufficient rate of conversion of NOx and if it is about 270 g/L or less, the strength of the honeycomb unit 11 tends not to be insufficient.

The zeolite is not particularly limited and it is possible to provide β-type zeolite, ZSM-5-Type zeolite, mordenite, faujasite, zeolite A, zeolite L, and the like wherein two or more kinds thereof may be used in combination.

Also, it is preferable that the molar ratio of silica to alumina in the zeolite be about 30-about 50.

Furthermore, the zeolite may be ion-exchanged in order to enhance its adsorption capacity for ammonia. Cation species for ion-exchanging are not particularly limited and it is possible to provide Fe, Cu, Ni, Co, Zn, Mn, Ti, Ag, V and the like wherein two or more kinds thereof may be used in combination. It is preferable that its ion exchange amount be about 1.0-about 10.0% by weight, wherein about 1.0-about 5.0% by weight is more preferable. If the ion exchange amount is about 1.0% by weight or more, an adsorption capacity for ammonia due to ion-exchange tends not to be insufficient and if it is about 10.0% by weight or less, its structural instability tends not to be caused when heat is applied. Additionally, for ion-exchanging of the zeolite, the zeolite may be dipped in an aqueous solution containing a cation.

Furthermore, it is preferable that the zeolite include a secondary particle and it is also preferable that the average particle diameter of the secondary particle of the zeolite be about 0.5-about 10 µm. If the average particle diameter of the secondary particle of the zeolite is about 0.5 µm or more, it is not necessary to add a large amount of the inorganic binder, and accordingly, its extrusion molding of the honeycomb unit is readily conducted, and if it is about 10 µm or less, the specific surface area of the zeolite tends not to be decreased so that the rate of conversion of NOx tends not to be decreased.

Moreover, the honeycomb unit 11 may further include an inorganic particle other than the zeolite in order to improve its strength. The inorganic particle other than the zeolite is not particularly limited and it is possible to provide alumina, silica, titania, zirconia, ceria, mullite, precursors thereof, and the like, wherein two or more kinds thereof may be used in combination. Among these, alumina and zirconia are more preferable.

For the inorganic particle other than the zeolite, it is preferable that its average particle diameter be about 0.5-about 10 µm. If this average particle diameter is about 0.5 µm or more, it is not necessary to add a large amount of the inorganic binder, and accordingly, its extrusion molding of the honeycomb unit is readily conducted, and if it is about 10 µm or less, the effect of improving the strength of the honeycomb unit 11 tends not to be insufficient. Additionally, the inorganic particle other than the zeolite may include a secondary particle.

Furthermore, it is preferable that the ratio of the average particle diameter of the secondary particle of the inorganic particle other than the zeolite to the average particle diameter of the secondary particle of the zeolite be about 1 or less, wherein about 0.1-about 1 is more preferable. If this ratio is about 1 or less, the effect of improving the strength of the honeycomb unit 11 tends not to be insufficient.

For the honeycomb unit 11, it is preferable that the content of the inorganic particle other than the zeolite be about 3-about 30% by weight, wherein about 5-about 20% by weight is more preferable. If this content is about 3% by weight or more, the effect of improving the strength of the honeycomb unit 11 tends not to be insufficient and if it is about 30% by weight or less, the content of the zeolite in the honeycomb unit 11 tends not to be decreased so that the rate of conversion of NOx tends not to be decreased.

The inorganic binder is not particularly limited and it may be possible to provide solid contents contained in alumina sol, silica sol, titania sol, water glass, sepiolite, attapulgite, and the like, wherein two or more kinds thereof may be used in combination.

For the honeycomb unit 11, it is preferable that the content of the inorganic binder be about 5-about 30% by weight, wherein about 10-about 20% by weight is more preferable. If the content of the inorganic binder is about 5% by weight or more, the strength of the honeycomb unit 11 tends not to be decreased, and if it is about 30% by weight or less, its molding for the honeycomb unit 11 tends not to be difficult.

It is preferable that the honeycomb unit 11 further include an inorganic fiber in order to improve its strength.

The inorganic fiber is not particularly limited as long as it is possible to improve the strength of the honeycomb unit 11, and it is possible to provide alumina, silica, silicon carbide, silica-alumina, glass, potassium titanate, aluminum borate, and the like, wherein two or more kinds thereof may be used in combination.

For the inorganic fiber, it is preferable that its aspect ratio be about 2-about 1,000, wherein about 5-about 800 is more preferable, and about 10-about 500 is still more preferable. If the aspect ratio is about 2 or more, the effect of improving the strength of the honeycomb unit 11 tends not to be small. On the other hand, if the aspect ration is about 1,000 or less, clogging of a die tends not to occur at the time of molding such as extrusion molding and the inorganic fiber tends not to be broken at the time of molding so that the effect of improving the strength of the honeycomb unit 11 tends not to be small.

For the honeycomb unit 11, it is preferable that the content of the inorganic fiber be about 3-about 50% by weight, wherein about 3-about 30% by weight is more preferable and about 5-about 20% by weight is still more preferable. If the content of the inorganic fiber is about 3% by weight or more, the effect of improving the strength of the honeycomb unit 11 tends not to be small, and if it is about 50% by weight or less, the content of the zeolite in the honeycomb unit tends not to be small so that the rate of conversion of NOx tends not to be decreased.

For the honeycomb unit 11, it is preferable that the opening ratio of its cross section perpendicular to its longitudinal directions be about 50-about 65% by weight. If the opening ratio is about 50% by weight or more, the zeolite tends to be used for conversion of NOx effectively, and if it is about 65% or less, the strength of the honeycomb unit 11 tends not to be insufficient.

For the honeycomb unit 11, it is preferable that the density of the through-holes 12 in its cross section perpendicular to its longitudinal directions be about 15.5-about 124/cm$^2$, wherein about 31-about 93/cm$^2$ is more preferable. If the density of the through-holes 12 is about 15.5/cm$^2$ or more, the zeolite tends to contact with exhaust gas so that the NOx conversion capability of the honeycomb unit 11 tends not to be decreased, and if it is about 124/cm² or less, the pressure loss of the honeycomb unit 11 tends not to be increased.

For the peripheral coat layer 14, it is preferable that its thickness be about 0.1-about 2 mm. If the thickness of the peripheral coat layer 14 is about 0.1 mm or more, the effect of improving the strength of the honeycomb structure 10 tends not to be insufficient, and if it is about 2 mm or less, the content of the zeolite per unit volume of the honeycomb structure 10 tends not to be decreased so that the NOx conversion capability of the honeycomb structure 10 tends not to be decreased.

Figure 2A:
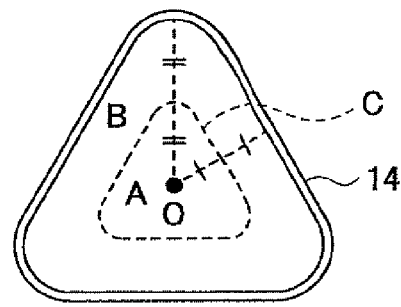
FIG. 2A is a schematic diagram illustrating another example of a cross section perpendicular to the longitudinal directions of a honeycomb structure according to an embodiment of the present invention.
Figure 2B:
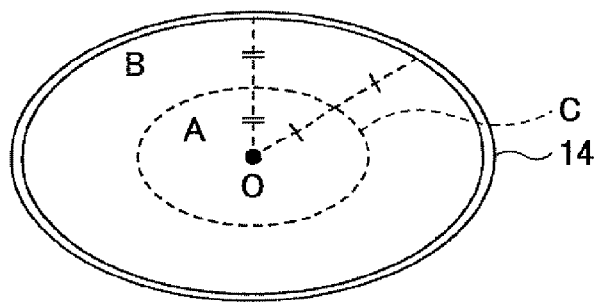
FIG. 2B is a schematic diagram illustrating yet another example of a cross section perpendicular to the longitudinal directions of a honeycomb structure according to an embodiment of the present invention.

Although the honeycomb structure 10 is cylinder-shaped one, the shape of a honeycomb structure according to an embodiment of the present invention is not particularly limited and it is possible to provide an almost triangle pillar shape (see FIG. 2A), an almost elliptic cylindroid shape (see FIG. 2B), and the like.

Furthermore, although the shape of the through-hole 12 is square-pillar-shaped one, the shape of the through-hole in an embodiment of the present invention is not particularly limited and it is possible to provide an almost triangle pillar shape, an almost hexagonal pillar shape, and the like.

Next, one example of a method for manufacturing the honeycomb structure 10 will be described. First, a raw material paste containing a zeolite and an inorganic binder, and if necessary, an inorganic particle other than the zeolite, an inorganic fiber, and the like is used to conduct molding such as extrusion molding so that a raw cylindrical honeycomb molded body is manufactured in which plural through-holes are intervened by a partition wall, extend in its longitudinal directions, and is provided in parallel. Thereby, it is possible to obtain a cylindrical honeycomb unit 11 having a sufficient strength even if a firing temperature is lowered. Herein, the structure of a die used for the molding is changed, for example, the thickness of a partition wall of the honeycomb unit 11, the density of the through-holes 12, or the like is adjusted, so that it is possible to control the partition wall thickness and opening ratio of the honeycomb unit 11.

Additionally, the inorganic binder such as alumina sol, silica sol, titania sol, water glass, sepiolite, and attapulgite, wherein two or more kinds thereof may be used in combination, is added in the raw material paste.

Additionally, an organic binder, a dispersing medium, a molding assistant, or the like may appropriately be added into the raw material paste according to need.

The organic binder is not particularly limited and it is possible to provide methyl cellulose, carboxymethyl cellulose, hydroxyethyl cellulose, polyethylene glycol, phenol resins, epoxy resins, and the like, wherein two or more kinds thereof may be used in combination. Additionally, it is preferable that the amount of the organic binder to be added be about 1-about 10% by weight relative to the total amount of the zeolite, the inorganic particle other than the zeolite, the inorganic fiber, and the inorganic binder.

The dispersing medium is not particularly limited and it is possible to provide water, organic solvents such as benzene, alcohols such as methanol, and the like, wherein two or more kinds thereof may be used in combination.

The molding assistant is not particularly limited and it is possible to provide ethylene glycol, dextrin, fatty acids, fatty acid soaps, polyalcohols, and the like, wherein two or more kinds thereof may be used in combination.

For preparing the raw material paste, it is preferable to conduct its mixing or kneading, wherein the mixing may be conducted by using a mixer, atriter, or the like and the kneading may be conducted by using a kneader or the like.

Then, the obtained honeycomb molded body is dried by a drying apparatus such as a microwave drying apparatus, a hot air drying apparatus, a dielectric drying apparatus, a suction drying apparatus, a vacuum drying apparatus, and a freeze drying apparatus.

Furthermore, the obtained honeycomb molded body is degreased. The conditions of its degreasing are not particularly limited and is allowed to select appropriately depending on the kind(s) or amount(s) of organic substance(s) contained in the molded body, wherein about 40° C. for about 2 hours is preferable.

Then, the obtained honeycomb molded bogy is fired to obtain a cylindrical honeycomb unit 11. It is preferable that its firing temperature be about 600-about 1,200° C., wherein about 600-about 1,000° C. is more preferable. If the firing temperature is about 600° C. or more, its sintering tends to progress so that the strength of the honeycomb unit 11 tends not to be decreased, and if it is about 1,200° C. or less, its sintering tends not to be progress excessively so that the reaction site of the zeolite tends not to be decreased.

Then, a paste for peripheral coat layer is applied on the peripheral surface of the cylindrical honeycomb unit 11. The paste for peripheral coat layer is not particularly limited and it is possible to provide mixtures of the inorganic binder(s) and inorganic particle(s), mixtures of the inorganic binder(s) and inorganic fiber(s), mixtures of the inorganic binder(s), inorganic particle(s) and inorganic fiber(s), and the like.

Furthermore, the paste for peripheral coat layer may include an organic binder. The organic binder is not particularly limited and it is possible to provide polyvinyl alcohol, methyl cellulose, ethyl cellulose, carboxymethyl cellulose, and the like, wherein two or more kinds thereof may be used in combination.

Then, the honeycomb unit 11 on which the paste for peripheral coat layer is applied is dried and solidified so as to obtain a cylindrical honeycomb structure 10. Herein, when the paste for peripheral coat layer includes an organic binder, it is preferable to conduct its degreasing. The conditions of the degreasing are allowed to select appropriately depending on the kind(s) or amount(s) of organic substance(s), wherein about 700° C. for about 20 minutes is preferable.

Figure 3A:
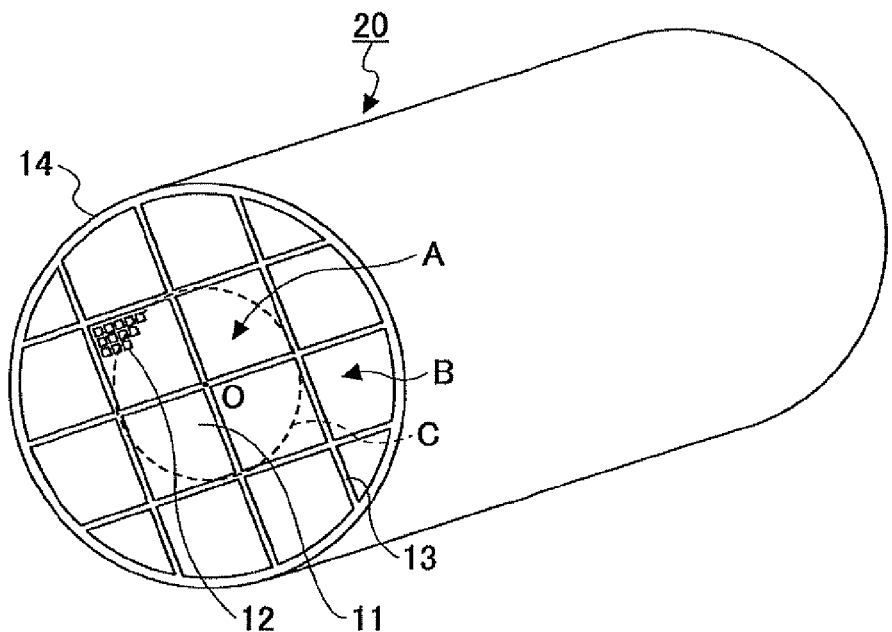
FIG. 3A is a perspective view illustrating another example of a honeycomb structure according to an embodiment of the present invention.
Figure 3B:
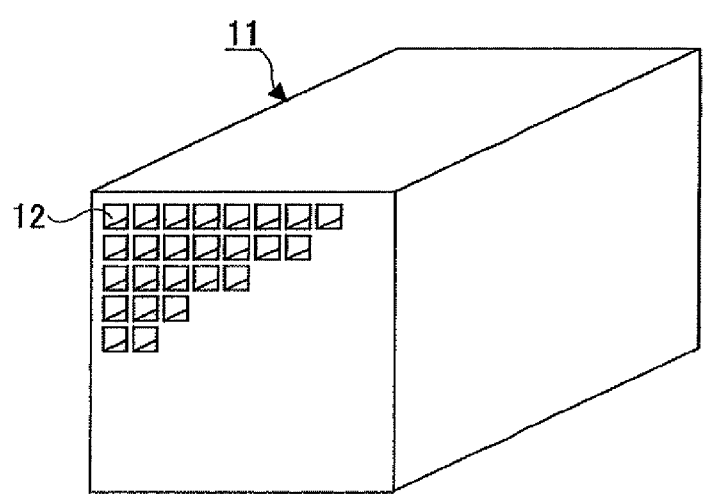
FIG. 3B is a perspective view illustrating a honeycomb unit in FIG. 3A.

FIG. 3A and FIG. 3B illustrate other examples of a honeycomb structure according to an embodiment of the present invention. Herein, a honeycomb structure 20 is similar to the honeycomb structure 10 except that plural honeycomb units 11 in which plural through-holed 12 are intervened by a partition wall, extend in its longitudinal directions and are provided in parallel are bonded by a bonding layer 13.

For the honeycomb units 11, it is preferable that the cross-sectional areas of their cross-sections perpendicular to their longitudinal directions be about 5-about 50 cm². If the cross-sectional areas are about 5 cm² or more, the specific surface area of the honeycomb structure 10 tends not to be decreased and its pressure loss tends not to be increased, and if the cross-sectional areas are about 50 cm² or less, the strength of the honeycomb units 11 against thermal stress caused therein tends not to be insufficient.

For the bonding layer 13 for bonding the honeycomb units 11, it is preferable that its thickness be about 0.5-about 2 mm. If the thickness of the bonding layer 13 is about 0.5 mm or more, its bonding strength tends not to be insufficient. On the other hand, the thickness of the bonding layer 13 is about 2 mm or less, the specific surface area of the honeycomb structure 10 tends not to be decreased and its pressure loss tends not to be increased.

Furthermore, although the honeycomb units 11 are square-pillar-shaped ones, the shapes of honeycomb units in an embodiment of the present invention are not particularly limited and their shapes such that the honeycomb units are easily bonded to one another are preferable, wherein it is possible to provide, for example, an almost hexagonal pillar shape and the like.

Next, one example of a method for manufacturing the honeycomb structure 20 will be described. First, square-pillar-shaped honeycomb units 11 are manufactured similarly to the case of the honeycomb structure 10. Herein, it is possible to manufacture honeycomb units 11 for its center side area A, for its periphery side area B, and for areas including their boundary line C, wherein the honeycomb units 11 for the center side area A and/or the honeycomb units 11 for the periphery side area B may be used for the area including the boundary line C in an embodiment of the present invention.

Then, a paste for bonding layer is applied on the peripheral surfaces of the honeycomb units 11 so as to bond the honeycomb units 11 sequentially and its drying and solidifying are conducted so as to manufacture an assembly of the honeycomb units 11. Herein, after the assembly of the honeycomb units 11 is manufactured, it may be cut into a cylindrical shape and polished. Also, honeycomb units 11 whose cross sections are molded into an almost fan shape(s) or an almost square shape(s) may be bonded so as to manufacture a cylindrical assembly of the honeycomb units 11.

The paste for bonding layer is not particularly limited and it is possible to provide mixtures of the inorganic binder(s) and inorganic particle(s), mixtures of the inorganic binder(s) and inorganic fiber(s), mixtures of the inorganic binder(s), inorganic particle(s) and inorganic fiber(s), and the like.

Furthermore, the paste for bonding layer may include an organic binder. The organic binder is not particularly limited and it is possible to provide polyvinyl alcohol, methyl cellulose, ethyl cellulose, carboxymethyl cellulose, and the like, wherein two or more kinds thereof may be used in combination.

Then, a paste for peripheral coat layer is applied on the peripheral surface of the assembly of the cylindrical honeycomb units 11. The paste for peripheral coat layer is not particularly limited and may contain the same materials as or may contain different materials from those of the paste for bonding layer. Also, the composition of the paste for peripheral coat later may be identical to the composition of the paste for bonding layer.

Then, the assembly of the honeycomb units 11 on which the paste for peripheral coat layer is applied are dried and solidified so as to obtain a cylindrical honeycomb structure 20. Herein, when the paste for bonding layer and/or the paste for peripheral coat layer contain(s) an organic binder, it is preferable to conduct its degreasing. The conditions of the degreasing are allowed to select appropriately depending on the kind(s) and amount(s) of organic substance(s), wherein about 700° C. for about 20 minutes are preferable.

Additionally, the honeycomb structures 10 and 20 may be manufactured by manufacturing the honeycomb structures using raw material pastes containing a non-ion-exchanged zeolite and subsequently dipping the honeycomb structures in an aqueous solution containing a cation so as to ion-exchange the zeolite.

EXAMPLES

Example 1

First, 2,250 g of β-type zeolite with 3% by weight of ions being exchanged with Cu, an average particle diameter being 2 μm, a silica/alumina ratio being 40 and a specific surface area being 110 m$^2$/g, 2,600 g of alumina sol with 20% by weight of a solid content as an inorganic binder-containing component, 550 g of γ-alumina with an average particle diameter of 2 μm as an inorganic particle, 780 g of an alumina fiber with an average fiber diameter of 6 μm and an average fiber length of 100 μm as an inorganic fiber, and 410 g of methyl cellulose as an organic binder were mixed and kneaded so as to obtain a raw material paste. Herein, zeolite particles were dipped in an aqueous solution of copper nitrate so as to be ion-exchanged with Cu. Also, the ion exchange amount of the zeolite was obtained by means of an ICP spectrometry using ICPS-8100 (produced by Shimadzu Corporation). Then, the raw material paste was extortion-molded by using an extrusion molding machine so as to obtain a raw cylindrical honeycomb molded body. Then, the honeycomb molded body was dried by using a microwave drying apparatus and a hot air drying apparatus and subsequently degreased at 400° C. for 5 hours. Then, its firing was conducted at 700° C. for 5 hours so as to obtain a cylindrical honeycomb unit 11 with a diameter of 143 mm and a length of 150 mm. In regard to the obtained honeycomb unit 11, the opening ratio of its cross section perpendicular to its longitudinal directions was 60% and the content of the zeolite per its apparent volume was 250 g/L.

Also, in regard to the honeycomb unit 11, its partition wall thickness A, its opening ratio X, and its through-holes density in its center side area A were 0.24 m, 63.8%, and 70/cm$^2$, respectively, and its partition wall thickness B, its opening ratio Y, and its through-holes density in its periphery side area B were 0.28 m, 58.8%, and 70/cm$^2$, respectively. Herein, the ratio of the partition wall thickness B to the partition wall thickness A was 1.17 and the ratio of the opening ratio Y to the opening ratio X was 0.92 (see Table 1). Additionally, a boundary line C which is the boundary between the center side area A and the periphery side area B was a circle at a distance of 71.5 mm from the center O of a cross section of the honeycomb unit 11 which was perpendicular to the longitudinal directions thereof, and the thickness of a partition wall including the boundary line C was the thickness of a partition wall in the center side area A.

Then, 29 parts by weight of γ-alumina with an average particle diameter of 2 μm as an inorganic particle, 7 parts by weight of an alumina fiber with an average fiber diameter of 6 μm and an average fiber length of 100 μm as an inorganic fiber, 34 parts by weight of an alumina sol with 20% by weight of a solid content as an inorganic binder containing component, 5 parts by weight of methyl cellulose as an organic binder, and 25 parts by weight of water were mixed and kneaded so as to obtain a paste for peripheral coat layer.

Furthermore, the paste for peripheral coat layer was applied on the peripheral surfaces of the honeycomb units 11 such that the thickness of a peripheral coat layer 14 was 0.4 mm, and subsequently, its drying and solidifying at 120° C. and its degreasing at 400° C. for 2 hours were conducted by using a microwave drying apparatus and a hot air drying apparatus, whereby a cylindrical honeycomb structure 10 with a diameter of 143.8 mm and a length of 150 mm was manufactured.

Examples 2 and 3 and Comparative Examples 1 and 2

Honeycomb structures 10 were manufactured similarly to example 1 except that the structure of a die of the extrusion molding machine was changed (see Table 1).

TABLE 1

| | Center side area A | | |
|---|---|---|---|
| | Partition wall thickness A [mm] | Opening ratio X [%] | Through-hole density [/cm$^2$] |
| Example 1 | 0.24 | 63.8 | 70 |
| Example 2 | 0.23 | 67.2 | 62 |
| Example 3 | 0.22 | 70.7 | 56 |
| Comparative example 1 | 0.30 | 60.0 | 54 |
| Comparative example 2 | 0.23 | 60.0 | 96 |

| | Periphery side area B | | |
|---|---|---|---|
| | Partition wall thickness B [mm] | Opening ratio Y [%] | Through-hole density [/cm$^2$] |
| Example 1 | 0.28 | 58.8 | 70 |
| Example 2 | 0.30 | 57.7 | 62 |
| Example 3 | 0.33 | 57.3 | 56 |
| Comparative example 1 | 0.30 | 60.0 | 54 |
| Comparative example 2 | 0.23 | 60.0 | 96 |

| | Ratio of partition wall thickness B to partition wall thickness A | Ratio of opening ratio Y to opening ratio X | Rate of conversion of NOx |
|---|---|---|---|
| Example 1 | 1.17 | 0.92 | 88 |
| Example 2 | 1.30 | 0.86 | 90 |
| Example 3 | 1.50 | 0.81 | 91 |
| Comparative example 1 | 1.00 | 1.00 | 75 |
| Comparative example 2 | 1.00 | 1.00 | 78 |

Example 4

First, 2,600 g of β-type zeolite with 3% by weight of ions being exchanged with Cu, an average particle diameter being 2 μm, a silica/alumina ratio being 40 and a specific surface area being 110 m$^2$/g, 2,600 g of alumina sol with 20% by weight of a solid content, 780 g of an alumina fiber with an average fiber diameter of 6 μm and an average fiber length of 100 μm, and 410 g of methyl cellulose were mixed and kneaded so as to obtain a raw material paste. Then, the raw material paste was extortion-molded by using an extrusion molding machine so as to obtain a raw honeycomb molded body. Then, the honeycomb molded body was dried by using a microwave drying apparatus and a hot air drying apparatus and subsequently degreased at 400° C. for 5 hours. Then, its firing was conducted at 700° C. for 5 hours so as to obtain a cylindrical honeycomb unit 11 with a diameter of 143 mm and a height of 150 mm. In regard to the obtained honeycomb unit 11, the opening ratio of its cross section perpendicular to its longitudinal directions was 65% and the content of the zeolite was 250 g/L.

Then, a peripheral coat layer 14 was formed on the peripheral surface of the honeycomb unit 11 similarly to example 1, whereby a honeycomb structure 10 was manufactured. In regard to the obtained honeycomb structure 10, its partition wall thickness A, its opening ratio X, and its through-holes density in its center side area A were 0.22 m, 66.5%, and 73/cm$^2$, respectively, and its partition wall thickness B, its opening ratio Y, and its through-holes density in its periphery side area B were 0.25 m, 61.3%, and 73/cm$^2$, respectively. Herein, the ratio of the partition wall thickness B to the partition wall thickness A was 1.14 and the ratio of the opening ratio Y to the opening ratio X was 0.92 (see Table 2).

Examples 5-7 and Comparative Examples 3 and 4

Honeycomb structures 10 were manufactured similarly to example 4 except that the structure of a die of the extrusion molding machine was changed (see Table 2).

TABLE 2

| | Center side area A | | |
|---|---|---|---|
| | Partition wall thickness A [mm] | Opening ratio X [%] | Through-hole density [/cm$^2$] |
| Example 4 | 0.22 | 66.5 | 73 |
| Example 5 | 0.20 | 67.7 | 76 |
| Example 6 | 0.18 | 69.6 | 87 |
| Example 7 | 0.15 | 71.2 | 105 |
| Comparative example 3 | 0.28 | 65.0 | 48 |
| Comparative example 4 | 0.18 | 65.0 | 116 |

| | Periphery side area B | | |
|---|---|---|---|
| | Partition wall thickness B [mm] | Opening ratio Y [%] | Through-hole density [/cm$^2$] |
| Example 4 | 0.25 | 61.3 | 73 |
| Example 5 | 0.28 | 57.2 | 76 |
| Example 6 | 0.30 | 51.3 | 87 |
| Example 7 | 0.30 | 47.2 | 105 |
| Comparative example 3 | 0.28 | 65.0 | 48 |
| Comparative example 4 | 0.18 | 65.0 | 116 |

| | Ratio of partition wall thickness B to partition wall thickness A | Ratio of opening ratio Y to opening ratio X | Rate of conversion of NOx |
|---|---|---|---|
| Example 4 | 1.14 | 0.92 | 88 |
| Example 5 | 1.40 | 0.84 | 90 |
| Example 6 | 1.67 | 0.73 | 92 |
| Example 7 | 2.00 | 0.66 | 92 |
| Comparative example 4 | 1.00 | 1.00 | 76 |
| Comparative example 4 | 1.00 | 1.00 | 79 |

Example 8

First, 1,900 g of β-type zeolite with 3% by weight of ions being exchanged with Cu, an average particle diameter being 2 μm, a silica/alumina ratio being 40 and a specific surface area being 110 m$^2$/g, 2,600 g of alumina sol with 20% by weight of a solid content as an inorganic binder-containing component, 1,100 g of γ-alumina with an average particle diameter of 2 μm as an inorganic particle, 780 g of an alumina fiber with an average fiber diameter of 6 μm and an average fiber length of 100 μm as an inorganic fiber, and 410 g of methyl cellulose as an organic binder were mixed and kneaded so as to obtain a raw material paste. Then, the raw material paste was extortion-molded by using an extrusion molding machine so as to obtain a raw honeycomb molded body. Then, the honeycomb molded body was dried by using a microwave drying apparatus and a hot air drying apparatus and subsequently degreased at 400° C. for 5 hours. Then, its firing was conducted at 700° C. for 5 hours so as to obtain a cylindrical honeycomb unit 11 with a diameter of 143 mm and a length of 150 mm. In regard to the obtained honeycomb unit 11, the opening ratio of its cross section perpendicular to its longitudinal directions was 55% and the content of the zeolite was 250 g/L.

Then, a peripheral coat layer 14 was formed on the peripheral surface of the honeycomb unit 11 similarly to example 1, whereby a honeycomb structure 10 was manufactured. In regard to the obtained honeycomb structure 10, its partition wall thickness A, its opening ratio X, and its through-holes density in its center side area A were 0.28 m, 56.9%, and 78/cm$^2$, respectively, and its partition wall thickness B, its opening ratio Y, and its through-holes density in its periphery side area B were 0.33 m, 50.3%, and 78/cm$^2$, respectively. Herein, the ratio of the partition wall thickness B to the partition wall thickness A was 1.18 and the ratio of the opening ratio Y to the opening ratio X was 0.88 (see Table 3).

Examples 9 and 10 and Comparative Examples 5 and 6

Honeycomb structures 10 were manufactured similarly to example 8 except that the structure of a die of the extrusion molding machine was changed (see Table 3).

TABLE 3

| | Center side area A | | |
|---|---|---|---|
| | Partition wall thickness A [mm] | Opening ratio X [%] | Through-hole density [/cm$^2$] |
| Example 8 | 0.28 | 56.9 | 78 |
| Example 9 | 0.25 | 58.6 | 85 |
| Example 10 | 0.22 | 60.2 | 96 |
| Comparative example 5 | 0.33 | 55.0 | 62 |
| Comparative example 6 | 0.25 | 55.0 | 105 |

| | Periphery side area B | | |
|---|---|---|---|
| | Partition wall thickness B [mm] | Opening ratio Y [%] | Through-hole density [/cm$^2$] |
| Example 8 | 0.33 | 50.3 | 78 |
| Example 9 | 0.35 | 45.1 | 85 |
| Example 10 | 0.38 | 39.3 | 96 |
| Comparative example 5 | 0.33 | 55.0 | 62 |
| Comparative example 6 | 0.25 | 55.0 | 105 |

| | Ratio of partition wall thickness B to partition wall thickness A | Ratio of opening ratio Y to opening ratio X | Rate of conversion of NOx |
|---|---|---|---|
| Example 8 | 1.18 | 0.88 | 89 |
| Example 9 | 1.40 | 0.77 | 91 |
| Example 10 | 1.73 | 0.65 | 92 |
| Comparative example 5 | 1.00 | 1.00 | 75 |
| Comparative example 6 | 1.00 | 1.00 | 78 |

Measurement of NOx Conversion Rate

Figure 4:
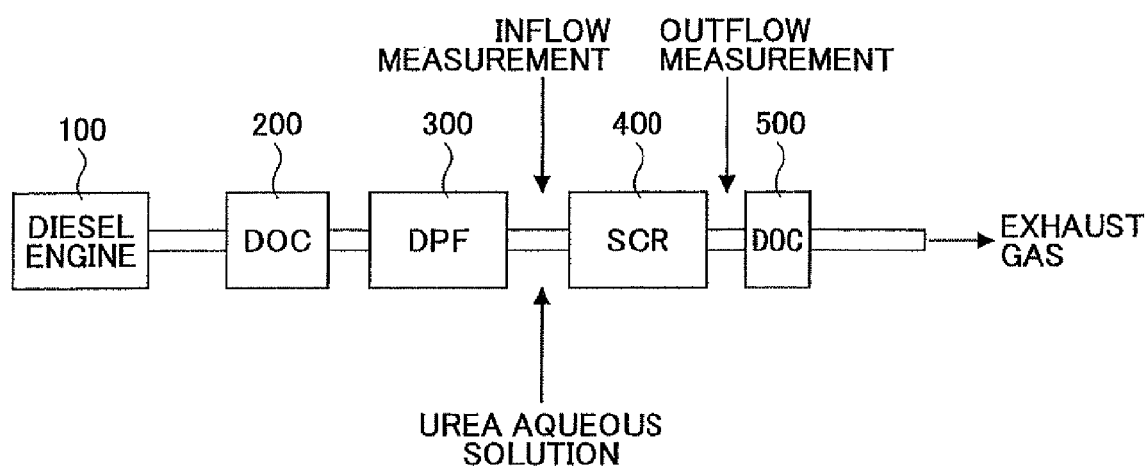
FIG. 4 is a diagram illustrating a method for measuring a rate of conversion of NOx.

As illustrated in FIG. 4, while a diesel engine (1.6 L direct-injection engine) 100 was connected to a diesel oxidation catalyst (DOC) 200, a diesel particulate filter (DPF) 300, a SCR 400, and a diesel oxidation catalyst (DOC) 500 via exhaust pipes in series, operation was made on the conditions of a rotation frequency of 300 rpm and a torque of 170 N·m and a urea aqueous solution was injected into the exhaust pipe immediately in front of the SCR 400. Herein, inflows of nitrogen monoxide (NO) and nitrogen dioxide ($NO_2$) into the SCR 400 and their outflows from the SCR 400 were measured by using a MEXA-7500DEGR (produced by HORIBA, Ltd.) and thus an NOx conversion rate [%] which was represented by the formula:

(NOx inflow−NOx outflow)/(NOx inflow)×100 was measured (with a detection limit of 0.1 ppm). Furthermore, a (commercially available) honeycomb structure with a diameter of 143.8 mm and a length of 7.35 mm, a (commercially available) honeycomb structure with a diameter of 143.8 mm and a length of 152.4 mm, the honeycomb structure in any one of examples 1-10 and comparative examples 1-6, and a (commercially available) honeycomb structure with a diameter of 143.8 mm and a length of 50.8 mm, which honeycomb structures were contained in metal containers (shells) on the condition that sealing members (mats) were provided on their peripheries, were used for the DOC 200, the DPF 300, the SCR 400, and the DOC 500, respectively. The measurement results were listed in Tables 1-3. From Tables 1-3, it is found that the NOx conversion rates of the honeycomb structures in examples 1-10 were superior to those of the honeycomb structures in comparative examples 1-6.

From the above descriptions, it is found that where a cross section perpendicular to the longitudinal directions of the honeycomb structure 10 was dual-partitioned at generally equally-spaced intervals from its periphery to its center, the thickness of a partition wall in its periphery side area B is greater than the thickness of a partition wall in its center side area A and its opening ratio in the center side area A is greater than its opening ratio in the periphery side area B, whereby it is possible to improve the NOx conversion rate of the honeycomb structure 10.

Although the illustrative embodiments and specific examples of the present invention have been described with reference to the accompanying drawings, the present invention is not limited to any of the illustrative embodiments and specific examples and the illustrative embodiments and specific examples may be altered, modified, or combined without departing from the scope of the present invention.

What is claimed is:

1. A honeycomb structure comprising:
   at least one honeycomb unit having a longitudinal direction and comprising:
      a zeolite;
      an inorganic binder; and
      walls having a thickness of from about 0.10 mm to about 0.50 mm and extending along the longitudinal direction to define through-holes;
   a center area inside a boundary line passing through positions located at substantially a half of a length from a center of the honeycomb structure to a periphery of the honeycomb structure in a cross section perpendicular to the longitudinal direction;
a peripheral area outside the boundary line;
a thickness of the walls located in the peripheral area being larger than a thickness of the walls located in the center area; and
a first opening ratio in the center area in the cross section being larger than a second opening ratio in the peripheral area in the cross section,
wherein the zeolite comprises a secondary particle having an average particle diameter from about 0.5 μm to about 10 μm.

2. The honeycomb structure according to claim 1, wherein the thickness of the walls located in the peripheral area is from about 0.15 mm to about 0.50 mm.

3. The honeycomb structure according to claim 1, wherein the thickness of the walls located in the center area is from about 0.10 mm to about 0.45 mm.

4. The honeycomb structure according to claim 1, wherein the second opening ratio in the peripheral area is from about 35% to about 65%.

5. The honeycomb structure according to claim 1, wherein the first opening ratio in the center area is from about 55% to about 75%.

6. The honeycomb structure according to claim 1, wherein a content of the zeolite per an apparent volume of the at least one honeycomb unit is from about 230 g/L to about 270 g/L.

7. The honeycomb structure according to claim 1, wherein the zeolite comprises at least one kind of β-type zeolite, Y-type zeolite, ferrierite, ZSM-5-Type zeolite, mordenite, faujasite, zeolite A, and zeolite L.

8. The honeycomb structure according to claim 1, wherein a molar ratio of silica to alumina in the zeolite is from about 30 to about 50.

9. The honeycomb structure according to claim 1, wherein the zeolite is ion-exchanged with at least one kind of Fe, Cu, Ni, Co, Zn, Mn, Ti, Ag, and V.

10. The honeycomb structure according to claim 1, wherein the at least one honeycomb unit further comprises an inorganic particle other than the zeolite.

11. The honeycomb structure according to claim 10, wherein the inorganic particle other than the zeolite comprises at least one kind of alumina, silica, titania, zirconia, ceria, mullite, and precursors thereof.

12. The honeycomb structure according to claim 1, wherein the inorganic binder comprises as a solid content at least one kind of alumina sol, silica sol, titania sol, water glass, sepiolite, and attapulgite.

13. The honeycomb structure according to claim 1, wherein the at least one honeycomb unit further comprises an inorganic fiber.

14. The honeycomb structure according to claim 13, wherein the inorganic fiber comprises at least one kind of alumina, silica, silicon carbide, silica-alumina, glass, potassium titanate, and aluminum borate.

15. A honeycomb structure comprising:
at least one honeycomb unit having a longitudinal direction and comprising:
  a zeolite;
  an inorganic binder; and
  walls having a thickness of from about 0.10 mm to about 0.50 mm and extending along the longitudinal direction to define through-holes;
a center area inside a boundary line passing through positions located at substantially a half of a length from a center of the honeycomb structure to a periphery of the honeycomb structure in a cross section perpendicular to the longitudinal direction;
a peripheral area outside the boundary line;
a thickness of the walls located in the peripheral area being larger than a thickness of the walls located in the center area; and
a first opening ratio in the center area in the cross section being larger than a second opening ratio in the peripheral area in the cross section,
wherein the at least one honeycomb unit comprises plural honeycomb units bonded by interposing a bonding layer.

16. The honeycomb structure according to claim 1, wherein the honeycomb structure comprises a single honeycomb unit.

17. The honeycomb structure according to claim 1, further comprising:
a peripheral coat layer provided on a peripheral surface of the honeycomb structure.

18. The honeycomb structure according to claim 1, wherein the thickness of the walls is substantially constant in each of the center area and peripheral area.

19. The honeycomb structure according to claim 1, wherein the thickness of the walls continuously or discontinuously varies in each of the center area and peripheral area.

20. The honeycomb structure according to claim 19, wherein the thickness of the walls located in the center area varies becoming smaller as approaching the center of the honeycomb structure.

21. The honeycomb structure according to claim 19, wherein the thickness of the walls located in the peripheral area varies becoming larger as approaching the periphery of the honeycomb structure.

22. The honeycomb structure according to claim 1, wherein a ratio of the thickness of the walls located in the peripheral area to the thickness of the walls located in the center area is from about 1.1 to about 2.0.

23. The honeycomb structure according to claim 1, wherein a ratio of the second opening ratio in the peripheral area to the first opening ratio in the center area is from about 0.6 to about 0.9.

24. The honeycomb structure according to claim 9, wherein the zeolite has an ion-exchange amount from about 1.0% to about 10.0% by weight.

25. The honeycomb structure according to claim 10, wherein an average particle diameter of the inorganic particle other than the zeolite is from about 0.5 μm to about 10 μm.

26. The honeycomb structure according to claim 10, wherein the inorganic particle other than the zeolite comprises a secondary particle thereof.

27. The honeycomb structure according to claim 26, wherein a ratio of an average particle diameter of the secondary particle of the inorganic particle other than the zeolite to the average particle diameter of the secondary particle of the zeolite is about 1 or less.

28. The honeycomb structure according to claim 10, wherein a content of the inorganic particle other than the zeolite in the at least one honeycomb unit is from about 3% to about 30% by weight.

29. The honeycomb structure according to claim 1, wherein a content of the inorganic binder in the at least one honeycomb unit is from about 5% to about 30% by weight.

30. The honeycomb structure according to claim 13, wherein an aspect ratio of the inorganic fiber is from about 2 to about 1000.

31. The honeycomb structure according to claim 13, wherein a content of the inorganic fiber in the honeycomb unit is from about 3% to about 50% by weight.

32. The honeycomb structure according to claim 1, wherein the opening ratio in the cross section perpendicular to the longitudinal direction of the at least one honeycomb unit is from about 50% to about 65%.

33. The honeycomb structure according to claim 1, wherein a density of the through-holes in the cross section perpendicular to the longitudinal direction of the at least one honeycomb unit is from about 15.5/cm$^2$ to about 124/cm$^2$.

34. The honeycomb structure according to claim 1, wherein the at least one honeycomb unit is produced by being fired at a firing temperature from about 600° C. to about 1200° C.

35. The honeycomb structure according to claim 15, wherein a surface area in the cross section perpendicular to the longitudinal direction of the at least one honeycomb unit is from about 5 cm$^2$ to about 50 cm$^2$.

36. The honeycomb structure according to claim 15, wherein the honeycomb structure is produced by binding the plural honeycomb units to provide an assembly of the plural honeycomb units and cutting the assembly of the plural honeycomb units.

37. The honeycomb structure according to claim 15, wherein the plural honeycomb units comprise the honeycomb unit having a substantially fan-shape or a substantially square-shape in the cross section.

38. The honeycomb structure according to claim 1, wherein a ratio of the thickness of the walls located in the peripheral area to the thickness of the walls located in the center area is from about 1.1 to about 2.0, and wherein a ratio of the second opening ratio in the peripheral area to the first opening ratio in the center area is from about 0.6 to about 0.9.

* * * * *